United States Patent
Arora et al.

(10) Patent No.: US 11,658,995 B1
(45) Date of Patent: May 23, 2023

(54) METHODS FOR DYNAMICALLY MITIGATING NETWORK ATTACKS AND DEVICES THEREOF

(71) Applicant: F5 Networks, Inc., Seattle, WA (US)

(72) Inventors: Judge Kennedy Singh Arora, San Jose, CA (US); Sandeep Agarwal, San Jose, CA (US); Nitesh Soni, San Jose, CA (US); Ravneet S. Dhaliwal, San Jose, CA (US)

(73) Assignee: F5, Inc., Seattle, WA (US)

( * ) Notice: Subject to any disclaimer, the term of this patent is extended or adjusted under 35 U.S.C. 154(b) by 457 days.

(21) Appl. No.: 16/359,045

(22) Filed: Mar. 20, 2019

Related U.S. Application Data

(60) Provisional application No. 62/645,627, filed on Mar. 20, 2018.

(51) Int. Cl.
H04L 9/40 (2022.01)
(52) U.S. Cl.
CPC ...... H04L 63/1441 (2013.01); H04L 63/1416 (2013.01); H04L 63/20 (2013.01)
(58) Field of Classification Search
None
See application file for complete search history.

(56) References Cited

U.S. PATENT DOCUMENTS

| | | | |
|---|---|---|---|
| 3,950,735 A | 4/1976 | Patel | |
| 4,644,532 A | 2/1987 | George et al. | |
| 4,897,781 A | 1/1990 | Chang et al. | |
| 4,965,772 A | 10/1990 | Daniel et al. | |
| 5,023,826 A | 6/1991 | Patel | |
| 5,053,953 A | 10/1991 | Patel | |
| 5,299,312 A | 3/1994 | Rocco | |

(Continued)

FOREIGN PATENT DOCUMENTS

| | | |
|---|---|---|
| EP | 744850 A2 | 11/1996 |
| WO | 1991014326 | 9/1991 |

(Continued)

OTHER PUBLICATIONS

BIG-IP Application Security Manager: Implementations, Version 11.6; Publication No. MAN-0358-07; F5 Networks, Inc.; Aug. 20, 2014; pp. 1-420.

(Continued)

*Primary Examiner* — Darren B Schwartz
*Assistant Examiner* — Hassan Saadoun
(74) *Attorney, Agent, or Firm* — Troutman Pepper Hamilton Sanders LLP

(57) ABSTRACT

Methods, non-transitory computer readable media, network traffic management apparatuses, and network traffic management systems that identify when a domain name identifier in a received request matches one of a plurality of domain names stored in a whitelist domain name storage. When the identification indicates the received domain name identifier fails to match one of the plurality of domain names stored in the whitelist domain name storage, then a determination is made on whether the received request is a suspicious request. Another storage is updated when the determination indicates the received request is the suspicious request or otherwise updating the received request as a valid request.

20 Claims, 4 Drawing Sheets

(56) References Cited

U.S. PATENT DOCUMENTS

| | | |
|---|---|---|
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,085,320 A | 7/2000 | Kaliski |
| 6,092,196 A | 7/2000 | Reiche |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,223,287 B1 | 4/2001 | Douglas et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,289,012 B1 | 9/2001 | Harrington et al. |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,430,562 B1 | 8/2002 | Kardos et al. |
| 6,434,081 B1 | 8/2002 | Johnson et al. |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,535,912 B1 | 3/2003 | Anupam et al. |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,683,873 B1 | 1/2004 | Kwok et al. |
| 6,691,165 B1 | 2/2004 | Bruck et al. |
| 6,708,187 B1 | 3/2004 | Shanumgam et al. |
| 6,742,045 B1 | 5/2004 | Albert et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,816,901 B1 | 11/2004 | Sitaraman et al. |
| 6,829,238 B2 | 12/2004 | Tokuyo et al. |
| 6,868,082 B1 | 3/2005 | Allen et al. |
| 6,876,629 B2 | 4/2005 | Beshai et al. |
| 6,876,654 B1 | 4/2005 | Hegde |
| 6,888,836 B1 | 5/2005 | Cherkasova |
| 6,928,082 B2 | 8/2005 | Liu et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,975,592 B1 | 12/2005 | Seddigh et al. |
| 6,987,763 B2 | 1/2006 | Rochberger et al. |
| 7,007,092 B2 | 2/2006 | Peiffer |
| 7,113,993 B1 | 9/2006 | Cappiello et al. |
| 7,139,792 B1 | 11/2006 | Mishra et al. |
| 7,228,422 B2 | 6/2007 | Morioka et al. |
| 7,287,082 B1 | 10/2007 | O'Toole, Jr. |
| 7,308,703 B2 | 12/2007 | Wright et al. |
| 7,321,926 B1 | 1/2008 | Zhang et al. |
| 7,333,999 B1 | 2/2008 | Njemanze |
| 7,343,413 B2 | 3/2008 | Glide et al. |
| 7,349,391 B2 | 3/2008 | Ben-Dor et al. |
| 7,454,480 B2 | 11/2008 | Labio et al. |
| 7,490,162 B1 | 2/2009 | Masters |
| 7,500,269 B2 | 3/2009 | Huotari et al. |
| 7,526,541 B2 | 4/2009 | Roese et al. |
| 7,552,199 B2 | 6/2009 | Pomerantz |
| 7,558,197 B1 | 7/2009 | Sindhu et al. |
| 7,624,424 B2 | 11/2009 | Morita et al. |
| 7,757,278 B2 | 7/2010 | Boneh et al. |
| 7,801,978 B1 | 9/2010 | Susai et al. |
| 7,857,002 B2 | 12/2010 | Reck |
| 7,916,728 B1 | 3/2011 | Mimms |
| 7,945,563 B2 | 5/2011 | Seitz |
| 8,103,809 B1 | 1/2012 | Michels et al. |
| 8,112,491 B1 | 2/2012 | Michels et al. |
| 8,112,799 B1 | 2/2012 | Loiodice et al. |
| 8,130,650 B2 | 3/2012 | Allen, Jr. et al. |
| 8,234,687 B2 | 7/2012 | Baumhof |
| 8,301,837 B1 | 10/2012 | Natarajan |
| 8,306,036 B1 | 11/2012 | Bollay |
| 8,346,993 B2 | 1/2013 | Michels et al. |
| 8,347,100 B1 | 1/2013 | Thornewell et al. |
| 8,356,352 B1 | 1/2013 | Wawda et al. |
| 8,447,884 B1 | 5/2013 | Baumann |
| 8,537,825 B1 | 9/2013 | Mimms |
| 8,554,999 B2 | 10/2013 | Natarajan |
| 8,578,482 B1 | 11/2013 | Yang |
| 8,582,599 B2 | 11/2013 | Hamamoto et al. |
| 8,584,233 B1 | 11/2013 | Yang et al. |
| 8,601,161 B2 | 12/2013 | Takeda et al. |
| 8,601,586 B1 | 12/2013 | Boutros et al. |
| 8,756,684 B2 | 6/2014 | Frantz et al. |
| 8,769,681 B1 | 7/2014 | Michels et al. |
| 8,776,166 B1 | 7/2014 | Erickson et al. |
| 8,856,898 B1 | 10/2014 | Thornewell et al. |
| 8,880,632 B1 | 11/2014 | Michels |
| 8,880,696 B1 | 11/2014 | Michels |
| 8,886,981 B1 | 11/2014 | Baumann et al. |
| 8,977,742 B1 | 3/2015 | Tang |
| 8,984,178 B2 | 3/2015 | Michels |
| 9,020,912 B1 | 4/2015 | Majee et al. |

(56) References Cited

U.S. PATENT DOCUMENTS

| | | |
|---|---|---|
| 9,032,519 B1 | 5/2015 | Maher |
| 9,055,093 B2 | 6/2015 | Borders |
| 9,083,760 B1 | 7/2015 | Hughes et al. |
| 9,106,699 B2 | 8/2015 | Thornewell et al. |
| 9,112,900 B1 | 8/2015 | Peacock et al. |
| 9,141,625 B1 | 9/2015 | Thornewell et al. |
| 9,154,453 B2 | 10/2015 | Michels et al. |
| 9,197,667 B2 | 11/2015 | Lyon |
| 9,203,837 B2 | 12/2015 | Pierson et al. |
| 9,223,599 B1 | 12/2015 | Racanelli |
| 9,231,879 B1 | 1/2016 | Wojcik |
| 9,246,819 B1 | 1/2016 | Thirasuttakorn |
| 9,294,502 B1 | 3/2016 | Benishti |
| 9,313,047 B2 | 4/2016 | Michels et al. |
| 9,336,239 B1 | 5/2016 | Hoffmann et al. |
| 9,444,839 B1 | 9/2016 | Faulkner et al. |
| 9,596,292 B1 | 3/2017 | Rankov |
| 9,674,144 B1 | 6/2017 | Lyon |
| 9,942,197 B2 | 4/2018 | Galbreath et al. |
| 9,942,250 B2 | 4/2018 | Stiansen et al. |
| 9,948,629 B2 | 4/2018 | Eisen |
| 10,050,792 B1 | 8/2018 | Johnson |
| 10,187,408 B1 | 1/2019 | Call et al. |
| 10,326,790 B2 | 6/2019 | Mattson et al. |
| 10,397,250 B1 | 8/2019 | Shemesh et al. |
| 2001/0023442 A1 | 9/2001 | Masters |
| 2002/0059428 A1 | 5/2002 | Susai et al. |
| 2002/0161913 A1 | 10/2002 | Gonzalez et al. |
| 2002/0198993 A1 | 12/2002 | Cudd et al. |
| 2003/0046291 A1 | 3/2003 | Fascenda |
| 2003/0086415 A1 | 5/2003 | Bernhard et al. |
| 2003/0108052 A1 | 6/2003 | Inoue et al. |
| 2003/0110379 A1 | 6/2003 | Ylonen et al. |
| 2003/0145062 A1 | 7/2003 | Sharma et al. |
| 2003/0208562 A1 | 11/2003 | Hauck et al. |
| 2003/0225485 A1 | 12/2003 | Fritz et al. |
| 2004/0019626 A1 | 1/2004 | Shepherd |
| 2004/0083382 A1 | 4/2004 | Markham et al. |
| 2004/0267920 A1 | 12/2004 | Hydrie et al. |
| 2004/0268358 A1 | 12/2004 | Darling et al. |
| 2005/0052440 A1 | 3/2005 | Kim et al. |
| 2005/0055435 A1 | 3/2005 | Gbadegesin et al. |
| 2005/0004887 A1 | 6/2005 | Igakura et al. |
| 2005/0122977 A1 | 6/2005 | Lieberman |
| 2005/0144441 A1 | 6/2005 | Govindarajan |
| 2005/0154837 A1 | 7/2005 | Keohane et al. |
| 2005/0187866 A1 | 8/2005 | Lee |
| 2005/0188051 A1 | 8/2005 | Sneh |
| 2005/0240662 A1 | 10/2005 | Wiener |
| 2006/0005017 A1 | 1/2006 | Black et al. |
| 2006/0059267 A1 | 3/2006 | Cugi et al. |
| 2006/0075028 A1 | 4/2006 | Zager et al. |
| 2006/0156416 A1 | 7/2006 | Huotari et al. |
| 2006/0161577 A1 | 7/2006 | Kulkarni et al. |
| 2006/0171365 A1 | 8/2006 | Borella |
| 2006/0233106 A1 | 10/2006 | Achlioptas et al. |
| 2006/0242300 A1 | 10/2006 | Yumoto et al. |
| 2006/0242694 A1 | 10/2006 | Gold et al. |
| 2006/0253581 A1 | 11/2006 | Dixon et al. |
| 2006/0259967 A1 | 11/2006 | Thomas et al. |
| 2006/0277286 A1 | 12/2006 | Zhang |
| 2007/0005984 A1 | 1/2007 | Florencio et al. |
| 2007/0016662 A1 | 1/2007 | Desai et al. |
| 2007/0016949 A1 | 1/2007 | Dunagan et al. |
| 2007/0039038 A1 | 2/2007 | Goodman et al. |
| 2007/0039050 A1 | 2/2007 | Aksenov et al. |
| 2007/0064661 A1 | 3/2007 | Sood et al. |
| 2007/0074169 A1 | 3/2007 | Chess et al. |
| 2007/0083646 A1 | 4/2007 | Miller et al. |
| 2007/0107048 A1 | 5/2007 | Halls et al. |
| 2007/0118879 A1 | 5/2007 | Yeun |
| 2007/0143851 A1 | 6/2007 | Nicodemus |
| 2007/0156592 A1 | 7/2007 | Henderson |
| 2007/0169191 A1 | 7/2007 | Greene et al. |
| 2007/0174491 A1 | 7/2007 | Still et al. |
| 2007/0255953 A1 | 11/2007 | Peyret |
| 2007/0297551 A1 | 12/2007 | Choi |
| 2008/0010377 A1 | 1/2008 | Nissennboim |
| 2008/0021729 A1 | 1/2008 | Calabria |
| 2008/0034136 A1 | 2/2008 | Ulenas |
| 2008/0092242 A1 | 4/2008 | Rowley |
| 2008/0133518 A1 | 6/2008 | Kapoor et al. |
| 2008/0134311 A1 | 6/2008 | Medvinsky et al. |
| 2008/0148340 A1 | 6/2008 | Powell et al. |
| 2008/0178162 A1 | 7/2008 | Sanford |
| 2008/0201599 A1 | 8/2008 | Ferraiolo et al. |
| 2008/0208957 A1 | 8/2008 | Ding et al. |
| 2008/0229427 A1 | 9/2008 | Ramirez |
| 2008/0235325 A1 | 9/2008 | Calvert |
| 2008/0244724 A1 | 10/2008 | Choe et al. |
| 2008/0256224 A1 | 10/2008 | Kaji |
| 2008/0256513 A1 | 10/2008 | Nathan |
| 2008/0271045 A1 | 10/2008 | Le Roy |
| 2008/0281983 A1 | 11/2008 | Cooley et al. |
| 2008/0289035 A1 | 11/2008 | Delia et al. |
| 2008/0289047 A1 | 11/2008 | Benea et al. |
| 2008/0301760 A1 | 12/2008 | Lim |
| 2008/0320567 A1 | 12/2008 | Shulman et al. |
| 2009/0006607 A1 | 1/2009 | Bu et al. |
| 2009/0049230 A1 | 2/2009 | Pandya |
| 2009/0064337 A1 | 3/2009 | Chien |
| 2009/0077383 A1 | 3/2009 | de Monseignat et al. |
| 2009/0119769 A1 | 5/2009 | Ross et al. |
| 2009/0125625 A1 | 5/2009 | Shim et al. |
| 2009/0132713 A1 | 5/2009 | Dutta et al. |
| 2009/0138749 A1 | 5/2009 | Moll et al. |
| 2009/0138937 A1 | 5/2009 | Erlingsson et al. |
| 2009/0141891 A1 | 6/2009 | Boyen et al. |
| 2009/0172396 A1 | 7/2009 | Gabel et al. |
| 2009/0182818 A1 | 7/2009 | Krywaniuk |
| 2009/0228956 A1 | 9/2009 | He et al. |
| 2009/0254994 A1 | 10/2009 | Waterson |
| 2009/0265760 A1 | 10/2009 | Zhu et al. |
| 2009/0287935 A1 | 11/2009 | Aull et al. |
| 2009/0300749 A1 | 12/2009 | Delia et al. |
| 2009/0304026 A1 | 12/2009 | Hamada |
| 2009/0319769 A1 | 12/2009 | Betouin et al. |
| 2010/0017880 A1 | 1/2010 | Masood |
| 2010/0023582 A1 | 1/2010 | Pedersen et al. |
| 2010/0036820 A1 | 2/2010 | Stergiou et al. |
| 2010/0100725 A1 | 4/2010 | Ozzie et al. |
| 2010/0106767 A1 | 4/2010 | Livshits et al. |
| 2010/0107247 A1 | 4/2010 | Shani |
| 2010/0122091 A1 | 5/2010 | Huang et al. |
| 2010/0138899 A1 | 6/2010 | Yamamoto et al. |
| 2010/0150154 A1 | 6/2010 | Viger et al. |
| 2010/0229223 A1 | 9/2010 | Shepard et al. |
| 2010/0250650 A1 | 9/2010 | Allen |
| 2010/0251330 A1 | 9/2010 | Kroeselberg et al. |
| 2010/0257354 A1 | 10/2010 | Johnston et al. |
| 2010/0275014 A1 | 10/2010 | Kelley |
| 2010/0275024 A1 | 10/2010 | Abdulhayoglu |
| 2010/0281536 A1 | 11/2010 | Richards et al. |
| 2010/0281563 A1 | 11/2010 | Eby |
| 2010/0313266 A1 | 12/2010 | Feng et al. |
| 2010/0325277 A1 | 12/2010 | Muthiah et al. |
| 2010/0333167 A1 | 12/2010 | Luo et al. |
| 2011/0047620 A1 | 2/2011 | Mahaffey et al. |
| 2011/0066718 A1 | 3/2011 | Susai et al. |
| 2011/0072082 A1 | 3/2011 | Fujiwaka |
| 2011/0164752 A1 | 7/2011 | Wainner et al. |
| 2011/0173295 A1 | 7/2011 | Bakke et al. |
| 2011/0219446 A1 | 9/2011 | Ichnowski |
| 2011/0282997 A1 | 11/2011 | Prince et al. |
| 2011/0321122 A1 | 12/2011 | Mwangi et al. |
| 2012/0174196 A1 | 7/2012 | Bhogavilli et al. |
| 2012/0227106 A1 | 9/2012 | Shulman et al. |
| 2012/0304249 A1 | 11/2012 | Luo et al. |
| 2013/0139214 A1 | 5/2013 | Chesla |
| 2013/0212240 A1 | 8/2013 | Thornewell et al. |
| 2013/0212680 A1* | 8/2013 | Winn .................. H04L 51/212 726/23 |
| 2013/0305365 A1 | 11/2013 | Rubin et al. |
| 2014/0019953 A1 | 1/2014 | Kolesnikov |

(56) References Cited

U.S. PATENT DOCUMENTS

| | | | |
|---|---|---|---|
| 2014/0096251 A1 | 4/2014 | Doctor et al. | |
| 2014/0304417 A1 | 10/2014 | Fleury et al. | |
| 2014/0310805 A1 | 10/2014 | Kandekar | |
| 2014/0380467 A1 | 12/2014 | Winquist et al. | |
| 2015/0052252 A1 | 2/2015 | Gilde et al. | |
| 2015/0096020 A1 | 4/2015 | Adams et al. | |
| 2015/0121060 A1 | 4/2015 | Mimms et al. | |
| 2015/0128274 A1 | 5/2015 | Giokas | |
| 2015/0341379 A1 | 11/2015 | Lefebvre et al. | |
| 2016/0018251 A1 | 1/2016 | Geserich et al. | |
| 2016/0021084 A1 | 6/2016 | Eisen | |
| 2016/0182542 A1 | 6/2016 | Staniford | |
| 2016/0241590 A1 | 8/2016 | Smith et al. | |
| 2016/0330236 A1 | 11/2016 | Reddy et al. | |
| 2016/0364577 A1 | 12/2016 | Williams | |
| 2016/0373474 A1 | 12/2016 | Sood et al. | |
| 2017/0053139 A1 | 2/2017 | Schenk et al. | |
| 2017/0078243 A1 | 3/2017 | Backman et al. | |
| 2017/0126627 A1 | 5/2017 | Yang et al. | |
| 2017/0222811 A1 | 8/2017 | Claes | |
| 2018/0091547 A1* | 3/2018 | St. Pierre | H04L 63/1458 |
| 2018/0103052 A1 | 4/2018 | Choudhury et al. | |
| 2018/0115535 A1 | 4/2018 | Mehta | |
| 2018/0124073 A1 | 5/2018 | Scherman et al. | |
| 2018/0124090 A1 | 5/2018 | Koren et al. | |
| 2018/0152474 A1 | 5/2018 | Winquist et al. | |
| 2018/0165457 A1 | 6/2018 | Holz et al. | |
| 2018/0205746 A1 | 7/2018 | Boutnaru et al. | |
| 2018/0234435 A1 | 8/2018 | Cohen et al. | |
| 2018/0316757 A1 | 11/2018 | Tucker | |
| 2019/0052570 A1 | 2/2019 | Blumenthal et al. | |
| 2019/0052655 A1* | 2/2019 | Benishti | G06Q 10/107 |
| 2019/0052675 A1 | 2/2019 | Krebs | |
| 2019/0166141 A1 | 5/2019 | Yu et al. | |
| 2019/0238544 A1* | 8/2019 | Rajahram | H04L 63/101 |
| 2019/0318136 A1 | 10/2019 | Martin | |
| 2020/0120119 A1 | 4/2020 | Kalra et al. | |
| 2020/0296125 A1 | 9/2020 | Alderson | |

FOREIGN PATENT DOCUMENTS

| | | |
|---|---|---|
| WO | 1995005712 | 2/1995 |
| WO | 1997009805 | 3/1997 |
| WO | 1997045800 | 12/1997 |
| WO | 1999005829 | 2/1999 |
| WO | 1999006913 | 2/1999 |
| WO | 1999010858 | 3/1999 |
| WO | 1999039373 | 8/1999 |
| WO | 1999064967 | 12/1999 |
| WO | 2000004422 | 1/2001 |
| WO | 2000004458 | 1/2001 |
| WO | 2008087633 A2 | 7/2008 |
| WO | 2014131048 A1 | 8/2014 |
| WO | 2019080860 A1 | 5/2019 |

OTHER PUBLICATIONS

BIG-IP Local Traffic Management: Basics, Version 11.6; Publication No. MAN-0538-00; F5 Networks, Inc.; Mar. 17, 2016; pp. 1-74.

F5 TMOS Operations Guide, Publication No. BIG-IP TMOSOps-02_0; F5 Networks, Inc.; Nov. 2015; pp. 1-279.

Traffic Management Shell (tmsh) Reference Guide; Version 11.5.1; Publication No. MAN-0306-08; F5 Networks, Inc.; Mar. 4, 2014; pp. 1-2394.

Fajardo; Open Diameter Software Architecture; Jun. 2004; Retrieved from the Internet<http://diameter.sourceforge.net/dimeter-architecture/index.html.

F5 Networks, Inc.; F5 BIG-IP TMOS: Operations Guide; Manual; Mar. 5, 2015; pp. 1-279.

F5 Networks, Inc.; BIG-IP Application Security Manager: Implementations; Manual; Jan. 31, 2014; Version 11.5; pp. 1-396.

A Process For Selective Routing of Servlet Content To Transcoding Modules; Research Disclosure 422124; Jun. 1999; pp. 889-890, IBM Corporation.

Abad, Cristina L., and Rafael I. Bonilla. "An analuysis on the schemes for detecting and preventing ARP cache poisoning attacks." Distributed Computing System Workshops, 2007. ICDCSW'07. 27th International Conference on. IEEE, 2007.

BIG-IP Controller with Exclusive OneConnect Content Switching Feature Provides a Breakthrough System for Maximizing Server and Network Performance, F5 Networks, Inc. Press Release, May 8, 2001, 2 pages, Las Vegas, Nevada.

Cheng et al; An Integrated Security Monitoring System for Digital Service Network Devices; 2017; 19th Asia-Pacific Network Operations and Management Symposium (APNOMS); pp. 118-122.

ColonelPanic: Browser plugins vs extension—the difference, retrieved from http://colonelpanic.net/2010/08/browser-plugins-vs-extensions-the-difference.

Crescendo Networks; Application Layer Processing (ALP); 2003-2009, pp. 168-186; Chapter 9; CN-5000E/5500E; Foxit Software Company.

Dhamija et al; The battle against phishing: dynamic security skinds; Symposium On Usable Privacy and Security (SOUPS); Jul. 6-8, 2005, Pittsburgh, PA. USA.

Extended European Search Report for corresponding EP Application No. 19214358.4; dated Mar. 25, 2020.

F5 Device ID+—Real-time Intelligence About Each Device Visiting Web and Mobile Websites; Product Overview; Shape—Part of F5 Networks, Inc., <https:Mnfo.shapesecurity.com/rs/935-ZAM-778/images/F5-Shape-DeviceID-Product-Overview.pdf>, pp. 1-5, last accessed Feb. 1, 2021.

F5 Networks Inc.; BIG-IP LTM and TMOS 12.0.0; Release Notes, Oct. 6, 2016, pp. 1-110, vol. 12.0, F5 Networks, Inc., Retrieved from the Internet<https://support.f5.com/kb/en-us/products/big ip_ltm/releasenotes/product/-elnote-ltm-12-0-0.html>.

F5 Networks Inc.; BIG-IP® Local Traffic Management: Basics; Manual Oct. 20, 2015; pp. 1-68, vol. 12.0, F5 Networks, Inc., Retrieved from the Internet<https://support.f5.com/kb/en-us/products/bi ip_ltm/manuals/product/ltmpasics-12-0-0.html>.

F5 Networks Inc.; BIG-IP® Local Traffic Manager: Implementations Manual; May 25, 2016, pp. 1-284, vol. 12.0, F5 Networks, Inc., Retrieved from the Internet<https://support.f5.com/kb/en us/products/big-ip_ltm/nanuals/product/ltm-implementations-12-0-0.html>.

F5 Networks Inc.; Configuration Guide for Local Traffic Management; F5 Networks Inc.; Jan. 2006; version 9.2.2; 406 pgs.

F5 Networks Inc.; F5 BIG-IP TMOS: Operations Guide Manual; Mar. 5, 2016, pp. 1-236, F5 Networks, Inc., Retrieved from the Internet<https://support.f5.com/kb/en-us/products/big-ip_ltm/manuals/product/f5-tmos-operationsguide.html>.

F5 Networks, Inc.; BIG-IP ASM Operations Guide; Dec. 2018; Retrieved from the Internet: <https://support.f5.com/kb/en-us/products/big-ip_asm/manuals/product/f5-asm-operations-guide.html>, F5 Networks, Inc.; 102 pages.

F5 Networks, Inc.; BIG-IPS Analytics: Implementations Manual, Aug. 10, 2018; Version 14.0, F5 Networks, Inc.; Retrieved from the Internet: <https://support.f5.com/kb/en-us/products/big-ip_analytics/manuals/product/big-ip-analytic,s-implementations-14-0-0.html>. 5 pages.

F5 Networks, Inc.; BIG-IPS Application Security Manager & Implementations Manual; Publication date: Aug. 10, 2019; Updated Aug. 16, 2020; F5 Networks, Inc.; Retrieved from the Internet: <https://techdocs.f5.com/en-us/bigip-14-0-0/big-ip-asm-implementations-14-0-0.html>. 8 pages.

F5 Networks, Inc.; BIG-IPS Application Security Manager Tm: Attack and Bot Signatures; Nov. 4, 2016; Version12.1; Retrieved from the Internet: <https://support.f5.com/kb/en-us/products/big-ip_asm/manuals/product/asm-bat-and-attack-signature-reference-12-1-0.html>, F5 Networks, Inc.; 50 pages.

F5 Networks, Inc.; BIG-IPS Application Security Manager Tm: Getting Started; Jul. 11, 2017; Version 12.1, Retrieved from the Internet: <https://support.f5.com/kb/en-us/products/big-ip_asm/manuals/product/asm-gettingstarted-12-1-0.html>, F5 Networks, Inc.; 70 pages.

(56) References Cited

OTHER PUBLICATIONS

F5 Networks, Inc.; BIG-IPS Application Security Manager Tm: Implementations; Sep. 29, 2017; Version 12.1; Retrieved from the Internet: <https://support.f5.com/kb/en-us/products/big_ip_asm/manuals/product/asmmplementations-12-1-0.html>, F5 Networks, Inc.; 388 pages.

F5 Networks, Inc.; BIG-IP® Application Security Manager & Attack and Bot Signatures Manual; Feb. 13, 2017; Version 13.0, F5 Networks, Inc.; Retrieved from the Internet: <https://support.f5.com/kb/en-us/products/big-ip_asm/manuals/product/asm-bot-and-attack-signatures-13-0-0.html>. 48 pages.

F5 Networks, Inc.; BIG-IP® Application Security Manager & External Monitoring of Big IP Systems Implementations Manual; Aug. 10, 2018; Version 14.0, F5 Networks, Inc., Retrieved from the Internet: <https://support.f5.com/kb/en-us/products/big-ip_ltm/manuals/product/external-monitoring-of-big-ip-systemsmplementations-14-0-0.html>. 21 pages.

F5 Networks, Inc.; BIG-IP® Application Security Manager & Getting Started Manual; Nov. 13, 2017; Version 13.1, F5 Networks, Inc.; Retrieved from the Internet: <https://support.f5.com/kb/en-us/products/bigp_asm/manuals/product/asm-getting-started-13-1-0.html>. 46 pages.

Fielding et al.; Hypertext Transfer Protocol—HTTP/1.1, Network Working Group RFC: 2068; Jan. 1997; pp. 1-162.

Fielding et al.; Hypertext Transfer Protocol—HTTP/1.1; Network Working Group RFC: 2616; Jun. 1999; The Internet Society; pp. 1-176.

Floyd et al.; Random Early Detection Gateways for Congestion Avoidance; Aug. 1993; IEEE/ACM Transactions on Networking; California; pp. 1-22.

Hayward et al; A Survey of Security in Software Defined Networks; IEEE Communications Surveys & Tutorials, vol. 18, Issue 1; 2016; pp. 623-654.

Hochmuth; F5; CacheFlow pump up content-delivery lines; Network World Fusion; Las Vegas, Nevada; May 4, 2001; 1 page.

Hsiao et al; A Secure Proxy-Based Cross Domain Communication for Web Mashups; 2011 Ninth IEEE European Conference on Web Services; pp. 57-64.

Kevin Borders, Atul Prakash: Web Tap: detecting covert web traffic; Proceeding of the 11th ACM conference on Computer and Communications Security CCS '04; New York, 2004; pp. 110-120.

Macvittie; Message-Based Load Balancing; Technical Brief; F5 Networks, Inc.; Jan. 2010; pp. 1-9.

Mehra et al.; Mitigating Denial of Service attack using CAPCHA Mechanism; 2011.

Patil et al; Client-side Automated Sanitizer for Cross-Site Scripting Vulnerabilities; International Journal of Computer Applications 0975-8887), vol. 121—No. 20, Jul. 2015; pp. 1-8.

SAFE—Shape AI Fraud EngineTM; Shape—Part of F5 Networks, Inc., <https://info.shapesecurity.com/rs/935-ZAM778/images/Shape%20AI%20Fraud%20Engine-Product%20Datasheet.pdf>; last accessed Feb. 1, 2021. Pages 1-2.

Schaefer; IIS and Kerberos Part 5—Protocol Transition; Constrained Delegation; S4U2S and S4U2P; Jul. 18, 2007; 21 pages. http://www.adopenstatic.com/cs/blogs/ken/archive/2007/07/19/8460.aspx.

Servlet/Applet/HTML authentication process with single sign-on; Research Disclosure 429128; Jan. 2000; IBM Corporation; pp. 163-164.

Shape Defense TM—AI-Powered Web and Mobile Fraud Prevention For Organizations of All Sizes; Shape—Part of F5 Networks, Inc., <https:Mnfo.shapesecurity.comirs/935-ZAM-778/images/Shape%20Defense%20-%20Product%20datasheet.pdf>; last accessed Feb. 1, 2021; pp. 1-2.

Shape Enterprise Defense—Solution Overview; Shape; <https://info.shapesecurity.com/rs/935-ZAM-778/images/Shape%20Enterprise%20Defense%20Solution%20Overview.pdf>; last accessed Feb. 1, 2021. Pages 1-5.

Traffic Surges; Surge Queue; Netscaler Defense; 2005, PowerPoint Presentation; slides 1-12; Citrix Systems, Inc.

Williams et al; The Ultimate Windows Server 2003 System Administrator's Guide: Forwarding Authentication; 2003; Figure 10.7, Addison-Wesley Professional; Boston, Massachusetts; 2 pages.

Windows Server 2003 Kerberos Extensions; Microsoft TechNet, 2003 (Updated Jul. 31, 2004), http://technet.microsoft.com/en-us/library/cc738207; Microsoft Corporation.

F5 Networks Inc.; Assigning Attack Signatures to Security Policies Manual; F5 Networks, Inc.; Retrieved from the Internet<https://techdocs.f5.com/kb/en-us/products/big-ip_asm/manuals/product/big-ip-asm-attackand-bot-signatures-14-1-0/01.html#g_uid-9e8b2b2f-1325-4715-a879-311c802b2e97>. 2019; 16 pages.

F5 Networks Inc.; BIG-IP 15.0.1 New and Installation Release Notes; Version 15.0.1; F5 Networks, Inc.; Retrieved from the Internet<https://techdoc,s.f5.com/kb/en-us/products/big-ip_ltm/releasenotes/product/relnote-bigip-15-0-1.html>. 2019, 33 pages.

Google, Under the Hood: How Password Checkup helps keep your accounts safe; available at: https://3.bp.blogspot.com/-1vjCRnXWibcD(FuP-PpY6yl/AAAAAAAAMIY/Ub7bi0AqFxQm7TH_e5EYVvCclywB7BWOwCLcBGAs/s1600/technical_infographic_new.png, accessed on Jun. 21, 2019; 2 pages.

BIG-IP Application Security Manager: Getting Started; Version 11.5, Publication No. MAN-0285-08; F5 Networks, Inc.; Jan. 27, 2014; pp. 1-76.

BIG-IP ASM 11.5.4; Release Notes Version 11.5.4; F5 Networks, Inc.; Apr. 12, 2016; pp. 1-46.

BIG-IP TMOS: Concepts, Version 11.5; Publication No. MAN-0378-04, F5 Networks, Inc.; May 1, 2014; pp. 1-148.

BIG-IP TMOS: Implementations, Version 11.5.1; Publication No. MAN-0379-08; F5 Networks, Inc.; Mar. 19, 2015; pp. 1-288.

BIG-IP Application Security Manager Operations Guide, Publication No. BIG-IP ASMOps 01_1; F5 Networks, Inc.; Jul. 2016; pp. 1-181.

BIG-IP Application Security Manager: Getting Started, Version 11.6; Publication No. MAN-0285-09; F5 Networks, Inc.; Aug. 20, 2014; pp. 1-78.

Kang et al. "WebVaccine: A Client-Side Realtime Prevention System against Obfuscated Malicious Web Pages," 2009 Fifth International Joint Conference on INC, IMS and IDC, 2009, IEEE, pp. 635-637 (Year: 2009).

\* cited by examiner

| DNS Response Codes | DNS Return Messages | Function |
|---|---|---|
| RCODE:0 | NOERROR | DNS Query completed successfully |
| RCODE:1 | FORMERR | DNS Query Format Error |
| RCODE:2 | SERVFAIL | Server failed to complete the DNS request |
| RCODE:3 | NXDOMAIN | Domain name does not exist. |
| RCODE:4 | NOTIMP | Function not implemented |
| RCODE:5 | REFUSED | The server refused to answer for the query |
| RCODE:6 | YXDOMAIN | Name that should not exist, does exist |
| RCODE:7 | XRRSET | RRset that should not exist, does exist |
| RCODE:8 | NOTAUTH | Server not authoritative for the zone |
| RCODE:9 | NOTZONE | Name not in zone |

FIG. 4

METHODS FOR DYNAMICALLY MITIGATING NETWORK ATTACKS AND DEVICES THEREOF

This application claims the benefit of U.S. Provisional Patent Application Ser. No. 62/645,627, filed Mar. 20, 2018, which is hereby incorporated by reference in its entirety.

FIELD

This technology generally relates to methods and systems for dynamically mitigating network attacks.

BACKGROUND

Denial-of-service (DoS) attacks are security events that occur when an attacker takes action that prevent legitimate users from accessing targeted computer systems, devices or other network resources. Denial-of-service (DoS) attacks typically flood servers, systems, or networks with traffic in order to overwhelm the victim resources and make it difficult or impossible for legitimate users to use them. While an attack that crashes a server can often be dealt with successfully by simply rebooting the system, flooding attacks can be more difficult to recover from.

One of the types of DoS attacks is an NX-Domain attack. In an NX-Domain attack, the attackers flood a non-authoritative domain name server (DNS server) with requests for nonexistent or invalid domain names. This causes the non-authoritative DNS server to spend its time searching for something that does not exist instead of serving legitimate requests. The result is that the cache on the non-authoritative DNS server gets filled with bad requests, the non-authoritative DNS server gets flooded with requests for non-existent domains and clients cannot find the servers the clients are looking for. Unfortunately, in the current marketplace the existing solutions to overcome NX-Domain attacks consume large amounts of memory and resources while still not providing complete protection against these attacks.

SUMMARY

A method, implemented in cooperation with a network traffic management system comprising one or more network traffic management apparatuses, client devices, or server devices, includes identifying when a domain name identifier in a received request matches one of a plurality of domain names stored in a whitelist domain name storage. When the identification indicates the received domain name identifier fails to match one of the plurality of domain names stored in the whitelist domain name storage, then a determination is made on whether the received request is a suspicious request. Another storage is updated when the determination indicates the received request is the suspicious request or otherwise updating the received request as a valid request.

A network traffic management apparatus including memory including programmed instructions stored thereon and one or more processors configured to be capable of executing the stored programmed instructions to identify when a domain name identifier in a received request matches one of a plurality of domain names stored in a whitelist domain name storage. When the identification indicates the received domain name identifier fails to match one of the plurality of domain names stored in the whitelist domain name storage, then a determination is made on whether the received request is a suspicious request. Another storage is updated when the determination indicates the received request is the suspicious request or otherwise updating the received request as a valid request.

A non-transitory computer readable medium having stored thereon instructions for including executable code that, when executed by one or more processors, causes the processors to identify when a domain name identifier in a received request matches one of a plurality of domain names stored in a whitelist domain name storage. When the identification indicates the received domain name identifier fails to match one of the plurality of domain names stored in the whitelist domain name storage, then a determination is made on whether the received request is a suspicious request. Another storage is updated when the determination indicates the received request is the suspicious request or otherwise updating the received request as a valid request.

A network traffic management system includes one or more traffic management modules, server modules, or client modules, memory comprising programmed instructions stored thereon, and one or more processors configured to be capable of executing the stored programmed instructions to identify when a domain name identifier in a received request matches one of a plurality of domain names stored in a whitelist domain name storage. When the identification indicates the received domain name identifier fails to match one of the plurality of domain names stored in the whitelist domain name storage, then a determination is made on whether the received request is a suspicious request. Another storage is updated when the determination indicates the received request is the suspicious request or otherwise updating the received request as a valid request.

This technology has a number of associated advantages including providing methods, non-transitory computer readable media, network traffic management apparatuses, and network traffic management systems that provides an optimized process of overcoming NX-Domain attacks. Additionally, this technology provides greater security from network attacks thus improving overall network performance.

BRIEF DESCRIPTION OF THE DRAWINGS

FIG. 4 is a table of an example of response codes associated with a DNS return message and a function.

DETAILED DESCRIPTION

Figure 1:
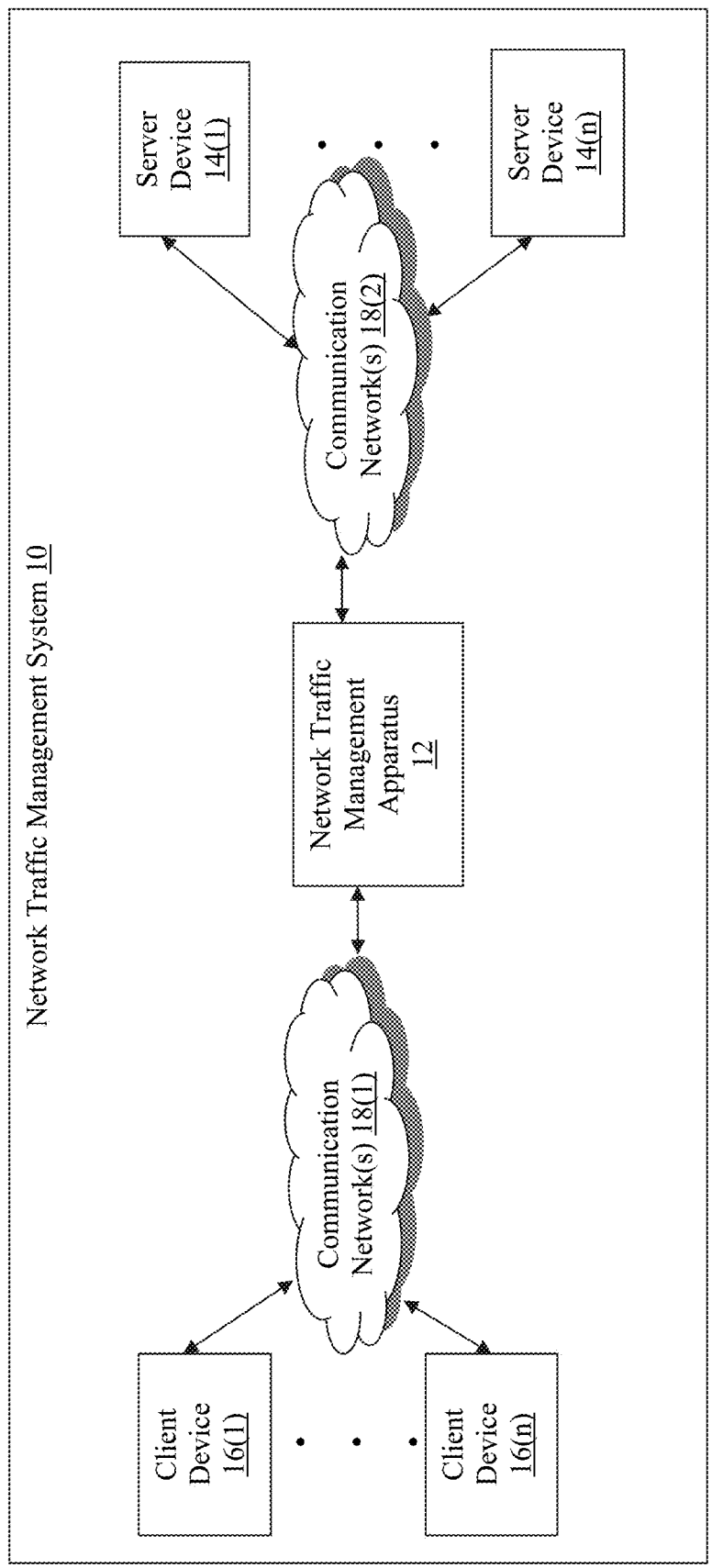
FIG. 1 is a block diagram of an exemplary network traffic management system with a network traffic management apparatus.

Referring to FIG. 1, an exemplary network environment which incorporates an exemplary network traffic management system 10 is illustrated. The network traffic management system 10 in this example includes a network traffic management apparatus 12 that is coupled to server devices 14(1)-14(n), and client devices 16(1)-16(n) via communication network(s) 18(1) and 18(2), although the network traffic management apparatus 12, server devices 14(1)-14(n), and client devices 16(1)-16(n) may be coupled together via other topologies. The network traffic management system 10 may include other network devices such as one or more routers or switches, for example, which are known in the art and thus will not be described herein. This technology provides a number of advantages including methods, non-transitory computer readable media, network traffic management systems, and network traffic management apparatuses that provide an optimized process of protection from Denial-of-Service (DoS) attacks.

In this particular example, the network traffic management apparatus 12, server devices 14(1)-14(n), and client devices 16(1)-16(n) are disclosed in FIG. 1 as dedicated hardware devices. However, one or more of the network traffic management apparatus 12, server devices 14(1)-14(n), or client devices 16(1)-16(n) can also be implemented in software within one or more other devices in the network traffic management system 10. As used herein, the term "module" refers to either an implementation as a dedicated hardware device or apparatus, or an implementation in software hosted by another hardware device or apparatus that may be hosting one or more other software components or implementations.

As one example, the network traffic management apparatus 12, as well as any of its components, models, or applications, can be a module implemented as software executing on one of the server devices 14(1)-14(n), and many other permutations and types of implementations can also be used in other examples. Moreover, any or all of the network traffic management apparatus 12, server devices 14(1)-14(n), and client devices 16(1)-16(n), can be implemented, and may be referred to herein, as a module.

Figure 2:
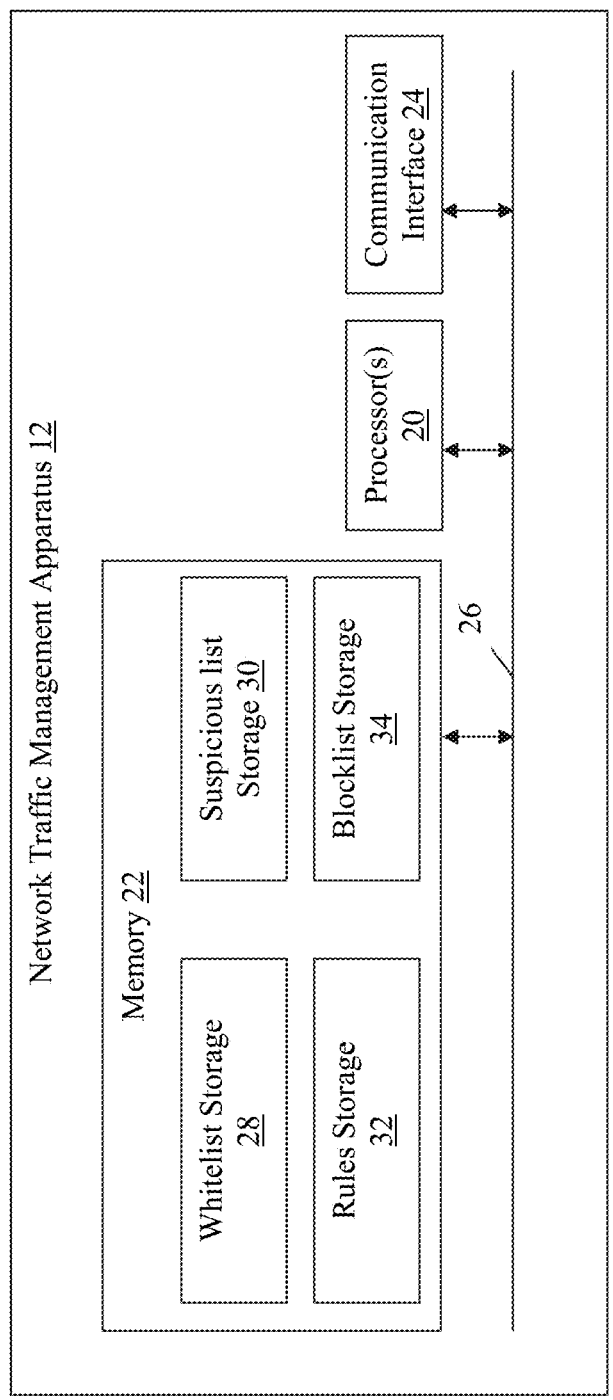

Referring to FIGS. 1-2, the network traffic management apparatus 12 of the network traffic management system 10 may perform any number of functions, including providing network security, load balancing network traffic across the server devices 14(1)-14(n), or accelerating network traffic associated with an application hosted by one or more of the server devices 14(1)-14(n), for example. The network traffic management apparatus 12 in this example includes one or more processor(s) 20, a memory 22, and a communication interface 24, which are coupled together by a bus 26, although the network traffic management apparatus 12 can include other types or numbers of elements in other configurations.

The processor(s) 20 of the network traffic management apparatus 12 may execute programmed instructions stored in the memory 22 of the network traffic management apparatus 12 for any number of the functions identified above. The processor(s) 20 of the network traffic management apparatus 12 may include one or more central processing units (CPUs) or general purpose processors with one or more processing cores, for example, although other types of processor(s) can also be used.

The memory 22 of the network traffic management apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 20, can be used for the memory 22.

Figure 3:
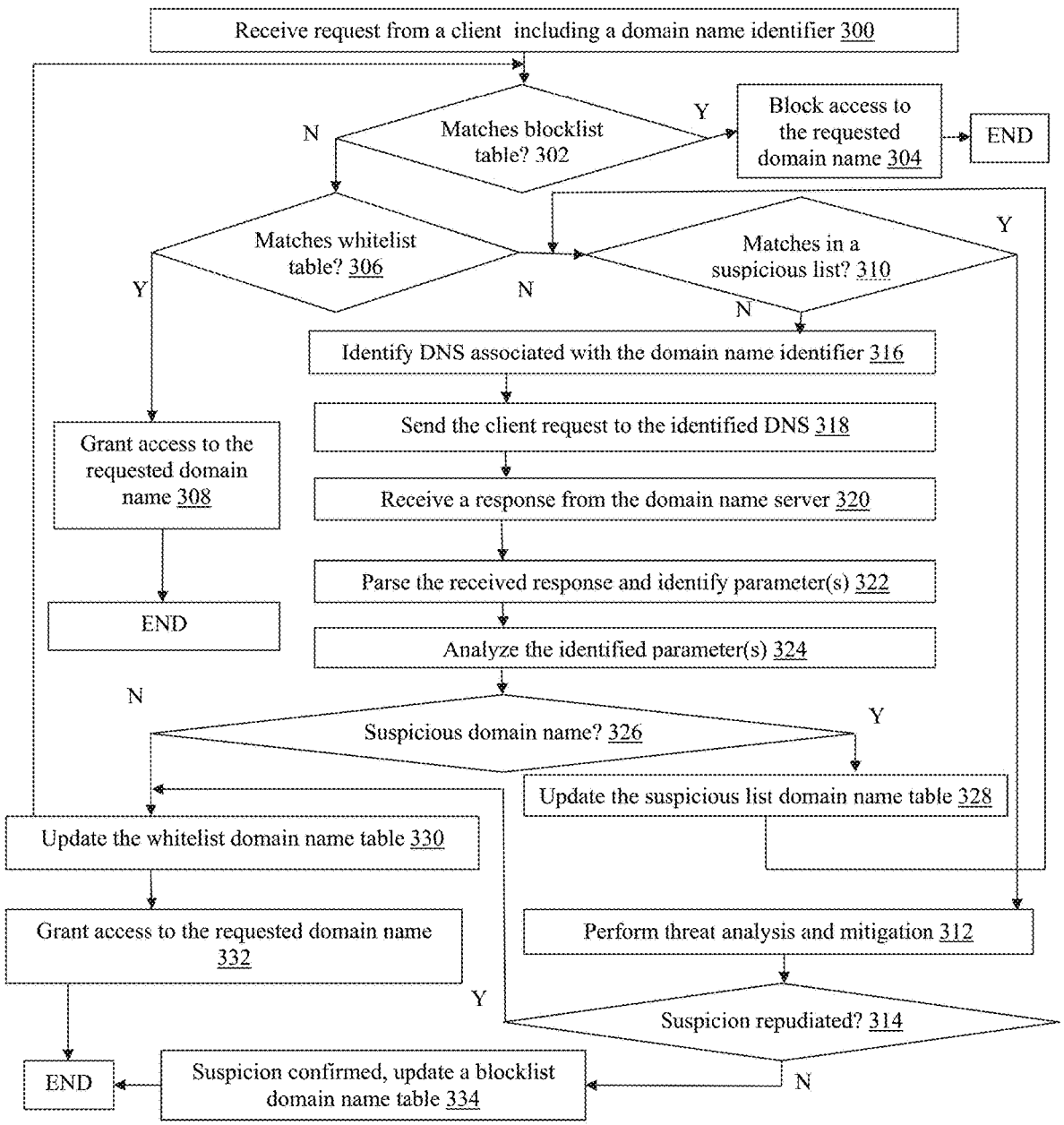
FIG. 3 is a flowchart of an exemplary method for dynamically mitigating network attacks.

Accordingly, the memory 22 of the network traffic management apparatus 12 can store one or more applications that can include computer executable instructions that, when executed by the network traffic management apparatus 12, cause the network traffic management apparatus 12 to perform actions, such as to transmit, receive, or otherwise process messages, for example, and to perform other actions described and illustrated below with reference to FIGS. 3-4. The application(s) can be implemented as components of other applications. Further, the application(s) can be implemented as operating system extensions, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the network traffic management apparatus 12 itself, may be located in virtual server(s) running in a cloud-based computing environment rather than being tied to one or more specific physical network computing devices. Also, the application(s) may be running in one or more virtual machines (VMs) executing on the network traffic management apparatus 12. Additionally, in one or more examples of this technology, virtual machine(s) running on the network traffic management apparatus 12 may be managed or supervised by a hypervisor.

In this particular example, the memory 22 of the network traffic management apparatus 12 includes a whitelist storage 28, a suspicious list storage 30, a rules storage 32 and a blocklist storage 34, although the memory can include other policies, modules, databases, or applications, for example.

In this example, the whitelist storage 28 stores a list of domain names that are determined to be valid domain names based on analyzing the DNS server responses. By way of example, the whitelist may be generated by the following process, although other manners for generating the whitelist list may be used. In this example, the network traffic management apparatus 12 may receive a request which includes a domain name for a destination website. The received request is routed to a DNS server to identify a destination website address associated with the domain name in the request. A response to the received request is received from the DNS server and based on analyzing the received response a determination is made by the network traffic management apparatus 12 that the domain name is a valid domain name. When a domain name is determined to be associated with a valid destination website address, then that domain name is determined to be a valid domain name. The valid domain name is stored in a table, called in this example a whitelist domain name table, in the whitelist storage. The whitelist domain name table in the whitelist storage may be a state table with a large bit map of a hash of the requested valid domain names, although, the whitelist domain name table may also include any other data. Further, the whitelist storage 28 may comprise a bloom filter, an associative memory, and a cache memory, although the whitelist storage 28 may comprise other types of storage capable of storing lists of domain names. Further, the whitelist storage 28 may also store an approximate whitelist domain table. In this example, the approximate whitelist domain table is allowed to be imprecise, as long as the approximate whitelist domain name table only errs in the manner of including domain names that may be a false positive match, with respect to a perfect whitelist domain name white list, as it may include a few domain names that are not valid and/or unsafe. Even though the approximate whitelist domain name table may include a few invalid and/or unsafe domain names, it still provides the advantage of greatly reducing the volume of traffic observed by the attack's victims. The whitelist domain name table(s) in the whitelist storage 28 are updated by adding the domain names determined to be valid and/or safe. The whitelist domain name table(s) are updated periodically and/or real time upon determining the domain names are valid.

In this example, the suspicious list storage 30 stores a list of suspicious domain names that are determined to be suspicious based on analyzing the DNS server responses, e.g. responses that have one or more parameters or other characteristics associated with a network threat or attack. By way of example, the suspicious list may be generated by the following process, although other manners for obtaining the suspicious list may be used. In this example, the network traffic management apparatus 12 may receive a request which includes a domain name for a destination website. The received request is routed to a DNS server to identify a destination website address associated with the domain name in the request. A response to the received request is received from the DNS server and based on analyzing the received response a determination is made by the network traffic management apparatus 12 that the domain name in this example is a suspicious domain name. When a domain name is determined to be potentially associated with an unknown, nonexistent and/or invalid destination website address, then that domain name is identified to be a potential network performance threat or a potential network security threat and is thus determined to be a suspicious domain name. The domain names identified as suspicious may potentially reduce the performance of the network by utilizing system resources for nonexistent destination addresses and thus slowing the network output for other valid domain name requests. The list of suspicious domain names is stored in a table called a suspicious list domain name table in the suspicious list storage 30. The suspicious list domain name table in the suspicious list storage 30 may be a state table with a large bit map of a hash of the requested suspicious domain names, although the suspicious list domain name table may include any other types of data storage to store the list of domain names. The suspicious list may include a plurality of cache tables storing domain names that are identified as suspicious. Further, the suspicious list storage 30 may be a bloom filter, an associative memory, or a cache memory, although, the suspicious list storage may comprise other types of storage capable of storing the list of suspicious domain names. The suspicious list domain name tables in the suspicious list storage 30 may be updated periodically and/or in real time by adding the domain names determined to be suspicious. In other examples of this technology, the suspicious list is not required and may never be populated. In these alternative examples, in lieu of a suspicious list any domain name that does not match the whitelist or the blacklist is presumed to be implicitly suspicious which improves performance and reduces memory requirements.

In this example the rules storage 32 stores a plurality of rules including parameter rules and mitigation rules, although other rules or data may be stored. The parameter rules may include, by way of example, for domain names identified as invalid and/or non-existent domain name they are to be included in the suspicious list domain name table in the suspicious list storage or mitigating threats associated with suspicious domain names stored in the suspicious list storage 30. The rules associated with threat mitigation may for example be rules for: rate limiting based on number of requests; rate limiting based on specific client devices; rate limiting based on specific DNS's; rate limiting based on assigned reputations, types of communication protocol; stress level of the DNS, quality of service associated with the client device; historical data associated with the request; geographical location of the request and/or time of the request explained in detail below, although other types of rules may be used.

In this example, the blocklist storage 34 stores a list of domain names that are determined to be a security threat based on analyzing the DNS server responses. By way of example, the blocklist may be generated by the following process, although other manners for obtaining the blocklist may be used. The network traffic management apparatus 12 may receive a request which includes a domain name for a destination website. The received request may be routed to a DNS server to identify a destination website address associated with the domain name in the request. A response to the received request is received from the DNS server and based on analyzing the received response a determination is made by the network traffic management apparatus 12 that the domain name in this example is an invalid domain name. When a domain name is determined to be associated with an unknown, nonexistent and/or invalid destination website address, then that domain name is identified to be a network performance threat and/or network security threat and is thus determined to be a domain name that needs to be blocked in any future requests. The list of domain names to be blocked may be stored in a table called a blocklist domain name table in the blocklist storage 34. The blocklist domain name table in the blocklist storage 34 may be a state table with a large bit map of a hash of the requested domain names, although the blocklist domain name table may also other types of data storage to store the list of domain names. Further, the blocklist storage 34 may be a bloom filter, an associative memory, or a cache memory, although the blocklist storage 34 may comprise other types of storage capable of storing the list of domain names. In other examples, the implementation of an approximate blocklist is allowed as an implementation optimization to only provide a "good approximation" of the actual contents, as long as the approximation guarantees that it will only ever underreport the set of domain names that would be in a perfect blocklist. Even though the approximate blocklist may exclude a small number of invalid and/or unsafe domain names, the approximate blocklist still provides the advantage of greatly reducing the volume of traffic observed by the attack's victims. The blocklist domain name tables in the blocklist storage 34 are updated by adding the domain names determined to be suspicious. The blocklist domain name tables are updated periodically and/or real time upon determining that the domain names are to be blocked. In yet other examples of this technology, the blocklist is not required and also may never be populated. In these alternative examples, the steps relating to the blocklist are skipped and the instead the domain name is checked for a match against a whitelist and a suspicious list as described herein which again improves performance and reduces memory requirements.

Referring back to FIGS. 1-2, the communication interface 24 of the network traffic management apparatus 12 operatively couples and communicates between the network traffic management apparatus 12, server devices 14(1)-14(n), and client devices 16(1)-16(n), which are coupled together at least in part by the communication network(s) 18(1) and 18(2), although other types or numbers of communication networks or systems with other types or numbers of connections or configurations to other devices or elements can also be used.

By way of example only, the communication network(s) 18(1) and 18(2) can include local area network(s) (LAN(s)) or wide area network(s) (WAN(s)), and can use TCP/IP over Ethernet and industry-standard protocols, although other types or numbers of protocols or communication networks can be used. The communication network(s) 18(1) and 18(2) in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

While the network traffic management apparatus 12 is illustrated in this example as including a single device, the network traffic management apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the network traffic management apparatus 12.

Additionally, one or more of the devices that together comprise the network traffic management apparatus 12 in other examples can be standalone devices or integrated with one or more other devices or apparatuses, such as one or more of the server devices 14(1)-14(n), for example. Moreover, one or more of the devices of the network traffic management apparatus 12 in these examples can be in a same or a different communication network including one or more public, private, or cloud networks, for example.

Each of the server devices 14(1)-14(n) of the network traffic management system 10 in this example includes processor(s), a memory, and a communication interface, which are coupled together by a bus or other communication link, although other numbers or types of components could be used. The server devices 14(1)-14(n) in this example can include domain name servers (DNS) servers, application servers, database servers, access control servers, or encryption servers, for example, that exchange communications along communication paths expected based on application logic in order to facilitate interactions with an application by users of the client devices 16(1)-16(n).

Accordingly, in some examples, one or more of the server devices 14(1)-14(n) process login and other requests received from the client devices 16(1)-16(n) via the communication network(s) 18(1) and 18(2) according to the HTTP-based application RFC protocol, for example. A web application may be operating on one or more of the server devices 14(1)-14(n) and transmitting data (e.g., files or web pages) to the client devices 16(1)-16(n) (e.g., via the network traffic management apparatus 12) in response to requests from the client devices 16(1)-16(n). The server devices 14(1)-14(n) may be hardware or software or may represent a system with multiple servers in a pool, which may include internal or external networks.

Although the server devices 14(1)-14(n) are illustrated as single devices, one or more actions of each of the server devices 14(1)-14(n) may be distributed across one or more distinct network computing devices that together comprise one or more of the server devices 14(1)-14(n). Moreover, the server devices 14(1)-14(n) are not limited to a particular configuration. Thus, the server devices 14(1)-14(n) may contain network computing devices that operate using a master/slave approach, whereby one of the network computing devices of the server devices 14(1)-14(n) operate to manage or otherwise coordinate operations of the other network computing devices. The server devices 14(1)-14(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices 14(1)-14(n) can operate within the network traffic management apparatus 12 itself rather than as a stand-alone server device communicating with the network traffic management apparatus 12 via communication network(s) 18(2). In this example, the one or more of the server devices 14(1)-14(n) operate within the memory 22 of the network traffic management apparatus 12.

The client devices 16(1)-16(n) of the network traffic management system 10 in this example include any type of computing device that can exchange network data, such as mobile, desktop, laptop, or tablet computing devices, virtual machines (including cloud-based computers), or the like. Each of the client devices 16(1)-16(n) in this example includes a processor, a memory, and a communication interface, which are coupled together by a bus or other communication link (not illustrated), although other numbers or types of components could also be used.

The client devices 16(1)-16(n) may run interface applications, such as standard web browsers or standalone client applications, which may provide an interface to make requests for, and receive content stored on, one or more of the server devices 14(1)-14(n) via the communication network(s) 18(1) and 18(2). The client devices 16(1)-16(n) may further include a display device, such as a display screen or touchscreen, or an input device, such as a keyboard for example (not illustrated). Additionally, one or more of the client devices 16(1)-16(n) can be configured to execute software code (e.g., JavaScript code within a web browser) in order to log client-side data and provide the logged data to the network traffic management apparatus 12, as described and illustrated in more detail later.

Although the exemplary network traffic management system 10 with the network traffic management apparatus 12, server devices 14(1)-14(n), client devices 16(1)-16(n), and communication network(s) 18(1) and 18(2) are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network security system 10, such as the network traffic management apparatus 12, server devices 14(1)-14(n), or client devices 16(1)-16(n), for example, may be configured to operate as virtual instances on the same physical machine. In other words, one or more of the network traffic management apparatus 12, server devices 14(1)-14(n), or client devices 16(1)-16(n) may operate on the same physical device rather than as separate devices communicating through communication network(s) 18(1) or 18(2). Additionally, there may be more or fewer network traffic management apparatuses, client devices, or server devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof.

The examples may also be embodied as one or more non-transitory computer readable media having instructions stored thereon, such as in the memory 22, for one or more aspects of the present technology, as described and illustrated by way of the examples herein. The instructions in some examples include executable code that, when executed by one or more processors, such as the processor(s) 20, cause the processors to carry out steps necessary to implement the methods of the examples of this technology that are described and illustrated herein.

An exemplary method for dynamically mitigating network attacks will now be described with reference to FIGS. 1-4. Referring more specifically to FIG. 3, in a first step 300 in this example, the network traffic management apparatus 12 of the network traffic management system 10 receives a request from one of the client devices 16(1)-16(n). The request includes a domain name identifier associated a destination website. The domain name identifier may include, by way of example, a website address, an uniform resource locator (URL) or a subset thereof. In this example, one of the client devices 16(1)-16(n) is being utilized by an attacker to access a non-existent domain name with the domain name identifier of "www.peter.com". In another example, the domain name identifier may be, "random1.peter.com" and/or "random2.peter.com", although, the request may include any number and types of identifiers associated with accessing a website. In this example, the attacker may also access a plurality client devices 16(1)-16(n) and input a non-existent domain name identifier to generate a plurality of requests that try to access a non-existent destination. Further, in another example, the attacker may use bots and/or any other form of automated software that would generate multiple client access requests to transmit a number of requests to a non-existent website.

In step 302, the network traffic management apparatus 12 of the network traffic management system 10 determines if the domain name identifier of the request matches with the list of invalid domain names stored in the blocklist domain name table of the blocklist storage. The list of domain names stored in the blocklist domain table comprises a list of previously stored invalid destination websites and includes invalid domain names. Although in this example a comparison against the blocklist is executed, in other examples steps 302, and 304 relating to the blocklist may be skipped which can improve performance and reduce memory and the process may proceed from step 300 to step 306 in these examples.

In this example a blocklist is used and accordingly if in step 302 the network traffic management apparatus 12 of the network traffic management system 10 determines that the domain name identifier of the request matches with one in the list of invalid domain names stored in the blocklist domain name table of the blocklist storage 34, then the Yes branch is taken to step 304. In step 304, the network traffic management apparatus 12 of the network traffic management system 10 blocks access to the requested domain name and this example of the method ends. Accordingly, if a domain name is invalid or is nonexistent this type of domain name could cause network performance issues which inadvertently reduce network performance. The network performance issues may include by way of example overloading DNS servers, network latencies, and/or network slow down.

If back in step 302, the network traffic management apparatus 12 of the network traffic management system 10 determines that the domain name identifier of the request matches with one in the list of invalid domain names stored in the blocklist domain name table of the blocklist storage 34, then the No branch is taken to step 306. In step 306, the network traffic management apparatus 12 of the network traffic management system 10 determines if the domain name identifier of the request has a match with anything in the list of valid domain names stored in the whitelist domain name table of the whitelist storage 28. The list of domain names stored in the whitelist domain table comprises domain names previously determined to be associated with valid destination websites. In another example, the whitelist domain name table of the whitelist storage 28 may comprise an approximate whitelist. The approximate whitelist is allowed to be imprecise, as long as the approximate whitelist only errors in the manner of including domain names that may be a false positive match, with respect to a perfect whitelist, as it may not include any domain names that are not valid and/or unsafe. Even though the approximate whitelist may include a few non-whitelisted domain names, this list still assists in greatly reducing the volume of traffic observed by one or more of the client devices 16(1)-16(n).

Accordingly, if in step 306 the network traffic management apparatus 12 of the network traffic management system 10 determines that the domain name identifier of the request matches with one in the list of valid domain names stored in the whitelist domain name table of the whitelist storage 28, then the Yes branch is taken to step 308. In step 308, the network traffic management apparatus 12 of the network traffic management system 10 grants access to the requested domain name based on the determination that the domain name identifier is a valid domain name and storage may be updated to reflect that the received request is a valid request. The network traffic management apparatus 12 then may send the request to the DNS server associated with the domain name identifier. A response is received by network traffic management apparatus 12 from the DNS server which includes the destination website internet protocol (IP) address associated with the domain name identifier. The network traffic management apparatus 12 then may establish a connection between the destination website and the one of the client devices 16(1)-16(n) requesting access to the website and this example of the method ends here.

If back in step 306, the network traffic management apparatus 12 of the network traffic management system 10 determines that the received domain name identifier does not match with any of the domain names stored in the whitelist, then the No branch is taken to step 310. In step 310, the network traffic management apparatus 12 of the network traffic management system 10 determines whether the domain name identifier matches with one of the domain names of the suspicious list in a suspicious list domain name table stored in the suspicious list storage 30. The suspicious list is a list of domain names that have been determined by the network traffic management apparatus 12 to be invalid or non-existent domain names that cause network performance threats. Although in this example the suspicious list is used, in other examples of this technology the suspicious list is not required and may never be populated or used. In these other examples, in lieu of a suspicious list any domain name that does not match the whitelist or the blacklist is presumed to be implicitly suspicious which improves performance and reduces memory requirements and is useful for some applications.

In this example the suspicious list is used and accordingly if in step 310 the network traffic management apparatus 12 determines that the received domain name identifier matches a domain name stored in the suspicious list then the Yes branch is taken to step 312. In step 312, the network traffic management apparatus 12 of the network traffic management system 10 performs a network threat analysis and mitigation of the suspicious domain name. In particular, in this example the domain name identifier determined to be invalid or nonexistent may undergo a network threat mitigation. One or more network threat mitigation techniques may be utilized by the network traffic management apparatus 12 to perform threat mitigation of the suspicious domain name. The network threat mitigation techniques may include by way of example, rate limiting based on number of requests, rate limiting based on blocking, rate limiting based on specific client devices 16(1)-16(n), rate limiting based on specific DNS's, rate limiting based on assigned reputations, types of communication protocol, stress level of the DNS, quality of service associated with the client devices 16(1)-16(n), historical data associated with the request, geographical location of the request and/or time of the request although rate limiting may be based on other factors.

In this example, the network threat mitigation technique of rate limiting based on number of requests may include limiting the number of suspicious requests to be processed for threat mitigation. By way of example, if the network traffic management apparatus 12 of the network traffic management system 10 receives 10,000 requests that are identified as suspicious requests in step 306, then based on a rate limiting only 2000 requests of the 10,000 requests may be processed for threat mitigation at a time, although other request limits and/or other mitigation techniques could be used. The stress level associated with a DNS server processing these request may also be periodically monitored. For example, when a determination is make that a first DNS server with rate limit threshold of 2000 requests is achieving this limit in a lesser amount of time in comparison with another DNS server then the first DNS server is at a higher stress. Upon determining that the first server is at a higher stress, then the network traffic management apparatus 12 increases the rate limit threshold to 3000 requests to reduce the associated stress levels, although any number of threshold requests and any other rules associated with rate limiting may also be used.

The network threat mitigation technique of rate limiting based on tracking specific client devices may include for example limiting the number of suspicious requests from a particular device. By way of example, when the network traffic management apparatus 12 of the network traffic management system 10 receives 10,000 requests, the network traffic management apparatus 12 may determine that 3000 requests have originated from a first client device. In this example, based on rules associated with rate limiting based on tracking specific client devices exceeding a set limit, requests generated from one of the client devices exceeding the limit, such as 2500, may be rate limited specifically for threat mitigation for a period of time, although again other rate limits and/or other rules may be used.

Another network threat mitigation technique that may be used is based on types of communication protocols. For example this mitigation technique may target requests received from client devices over a user data gram protocol (UDP). UDP does not include handshake dialogues for communication and is subject to spoofing and other forms of network attacks and hence is not secure and is unreliable. Accordingly, with this mitigation technique, when the network traffic management apparatus 12 receives a request over a UDP communication protocol then the network traffic management apparatus 12 requests the one of the client devices 16(1)-16(n) to transmit the same request over a transmission control protocol (TCP), based on rules stored in the rules storage 32 for threat mitigation. TCP requires handshakes dialogues and is more secure and reliable in comparison to UDP. By requesting the one of the client devices 16(1)-16(n) to transmit the request over TCP, software bots utilizing by attackers to send invalid requests cannot respond back to this request and hence the threat of attacks from those requests generated by software bots is mitigated.

In step 314, the network traffic management apparatus 12 of the network traffic management system 10 determines if a suspicious network performance threat associated with the suspicious domain name has been repudiated. By way of example only, when the network traffic management apparatus 12 requests a client device to retransmit the request determined to be suspicious over a TCP protocol when that request was originally received over a UDP and the request is retransmitted over TCP then the threat is mitigated.

Accordingly, if in step 314 the network traffic management apparatus 12 determines that the threat associated with the suspicious domain names has been repudiated, then the Yes branch is taken to step 330. In step 330, the whitelist domain name table is updated with the threat mitigated domain name.

In step 332, the network traffic management apparatus 12 of the network traffic management system 10 grants access to the requested domain name based on the determination that the domain name identifier is a valid domain name and storage may be updated to reflect that the received request is a valid request. The network traffic management apparatus 12 then may send the request to the DNS server associated with the domain name identifier. A response is received by network traffic management apparatus 12 from the DNS server which includes the destination website internet protocol (IP) address associated with the domain name identifier. The network traffic management apparatus 12 then may establish a connection between the destination website and the one of the client devices 16(1)-16(n) requesting access to the website and this example of the method ends here.

If back in step 314, the network traffic management apparatus 12 of the network traffic management system 10 determines that the threat associated with the suspicious domain names has not been repudiated, then the No branch is taken to step 334. For example, the network traffic management apparatus 12 may determine that domain name identifier is for an invalid or non-existent domain name which cannot be mitigated and as a result is thus a threat to the network. To avoid processing and utilizing resources for any future requests for the same domain name, the network traffic management apparatus 12 includes the domain name identifier in a blocklist domain name table stored in the blocklist storage to block any requests associated with that domain name identified as a threat. By blocking future requests for these domain names identified as a threat, the network traffic management apparatus 12 saves system resources and avoids unnecessary processing and thus improves the system output. Accordingly, in step 334, the network traffic management apparatus 12 of the network traffic management system 10 updates a blocklist domain name table and may block the received request, although other types of operations may be performed, such as sending an electronic notification to an administrator computing device regarding the update by way of example, and this example of the method may end.

If back in step 310, the network traffic management apparatus 12 of the network traffic management system 10 determines that the received domain name identifier does not match a domain name stored in the suspicious list then the No branch is taken to step 316. In step 316, the network traffic management apparatus 12 of the network traffic management system 10 identifies a domain name server (DNS) associated with the domain name identifier which in this example is one of the server devices 14(1)-14(n).

In step 318, the network traffic management apparatus 12 of the network traffic management system 10 sends the request to the identified one of the server devices 14(1)-14(n). The identified one of the server devices 14(1)-14(n) receives the request with the domain name identifier and based on the received domain name identifier determines the destination website address associated with the domain name identifier. The identified one of the server devices 14(1)-14(n) may be coupled to a database that stores corresponding associations between domain name identifiers and website addresses. The one of the server devices 14(1)-14(n) sends a response to the network traffic management apparatus 12.

In step 320, the network traffic management apparatus 12 of the network traffic management system 10 receives a response from the one of the server devices 14(1)-14(n). The one of the server devices 14(1)-14(n) sends a response to the network traffic management apparatus 12 based on determining whether the domain name identifier has a valid or an invalid destination website address. The DNS response includes a fully qualified domain name (FQDN) and a plurality of server response codes associated with corresponding plurality of DNS return messages and their functions. Although, any other parameter associated with the DNS server response may be included in the response. The fully qualified domain name (FQDN) is always written in this format: [host name].[domain].[tld]. For example, a mail server on the example.com domain may use the FQDN of "mail.example.com". Further, the DNS response codes may include, by way of example, RCODE:0, RCODE:1, RCODE:2, RCODE:3, RCODE:4, RCODE:5, RCODE:6, RCODE:7, RCODE:8 AND RCODE:9. Although any number of response codes with their associated DNS return messages and functions may be included. Each of the response codes is associated with a DNS return message and their functions illustrated in table shown in FIG. 4.

In this example, when the received domain name identifier does not correspond to any of the stored associations between the domain name identifiers and website address, then the DNS response received from the one of the server devices 14(1)-14(n) may include a response code of RCODE:3 that has a DNS return message of NXDOMAIN with the function of "domain name does not exist". In another example, when the received domain name identifier does correspond to a stored association between the domain name identifiers and the website address, then the DNS response received from the one of the server devices 14(1)-14(n) may include a response code of RCODE:0 that has a DNS return message of NOERROR with the function of "DNS query completed successfully".

In step 322, the network traffic management apparatus 12 of the network traffic management system 10 parses the received response. The received DNS server response includes a plurality of parameters, such as FQDN and response codes as explained above. The network traffic management apparatus 12 parses the received response to identify the plurality of parameters in the DNS response. The network traffic management apparatus 12 of the network traffic management system 10 identifies plurality of parameters in the DNS response based on parsing the received response. By way of example, the plurality of parameters identified in the DNS response includes the FQDN and the response codes, although, any number of other parameters may be identified based on the parsing.

In step 324, the network traffic management apparatus 12 of the network traffic management system 10 analyzes each of the identified parameters based on parameter rules stored in the rules storage in the memory of the network traffic management apparatus 12, although other manners for analyzing the parameters may be used. The parameter rules may include, by way of example, rules for identifying domain names as invalid and/or non existent. Domain names identified as valid and/or existent domain name are included in the whitelist domain name table in the whitelist storage 28. Suspicious domain names that have threats that have not been mitigated are included in the blocklist domain name table of the blocklist storage 34. Suspicious domain names that have threats that have been mitigated may be included in the whitelist domain name table of the whitelist storage 28.

By way of example, for the domain name identifier of "www.peter.com" the DNS response received from the DNS may include a response code of RCODE: 3 that has a DNS return message of NXDOMAIN with the function of "domain name does not exist", then the domain name identifier is determined as invalid and/or non-existent domain name and is to be included in the suspicious list domain name table in the suspicious list storage. By way of example, for the domain name identifier of "www.mail.google.com/" the DNS response received from the DNS may include a response code of RCODE:0 that has a DNS return message of NOERROR with the function of "DNS Query completed successfully", then the domain name identifier is determined as valid and/or existent domain name and is to be included in the whitelist domain name table in the whitelist storage 28.

In step 326, the network traffic management apparatus 12 of the network traffic management system 10 determines whether the response indicates that the request was for a suspicious domain name, based on the analysis of step 324. If in step 326, the network traffic management apparatus 12 of the network traffic management system 10 determines that the response includes an invalid or non-existent domain name, then the Yes branch is taken to step 328. In step 328, the network traffic management apparatus 12 of the network traffic management system 10 updates the suspicious list with the domain name identifier determined to be invalid or non-existent in the suspicious list domain name table of the suspicious list storage 30 and this example of the method may return to step 310 as described earlier.

If back in step 326, the network traffic management apparatus 12 of the network traffic management system 10 determines that the response indicates that the request was not for a suspicious domain name, then the No branch is taken to step 330 and then step 332 as described earlier.

Accordingly, as illustrated and described by way of the examples herein this technology provides an optimized process of overcoming NX-Domain attacks. Additionally, this technology provides greater security from network attacks thus improving overall network performance.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for dynamically mitigating network attacks implemented by a network traffic management system comprising one or more network traffic management apparatuses, client devices, or server devices, the method comprising:
identifying when a domain name identifier in a received request matches one of a plurality of domain names stored in a whitelist domain name storage;
determining when the received request is a suspicious request when the identification indicates the received domain name identifier fails to match one of the plurality of domain names stored in the whitelist domain name storage; and
updating another storage when the determination indicates the received request is the suspicious request or otherwise updating the received request as a valid request;
wherein the determining when the received request is the suspicious request further comprises:
determining when the received domain name identifier matches one of a plurality of domain names stored in a suspicious list domain name storage,
executing threat mitigation on the received request when the determination indicates that the received domain name identifier matches one of the plurality of domain names stored in the suspicious list domain name storage,
determining when the executed threat mitigation repudiated a threat associated with the received domain name identifier, and
updating the whitelist domain name storage with the received domain name identifier when the determination indicates the threat was repudiated.

2. The method of claim 1, further comprising:
determining when the received domain name identifier matches one of a plurality of domain names stored in a blocklist domain name storage; and
blocking access to the received request when the determination indicates the received domain name identifier matches one of the domain names stored in the blocklist domain name storage.

3. The method of claim 1, wherein the determining when the received request is the suspicious request further comprises designating the received request as a suspicious request when the determination indicates that the received domain name identifier fails to match one of the plurality of domain names stored in the whitelist domain name storage.

4. The method of claim 1, wherein the determining when the received request is the suspicious request further comprises:
receiving a response from a domain name server in response to the received request when the determination indicates that the received domain name identifier fails to match one of the plurality of domain names stored in the suspicious list domain name storage;
parsing the response to identify one or more parameters;
determining when the received request is the suspicious request based on analyzing the identified one or more parameters; and
updating the suspicious list domain name storage with the received domain name identifier when the determination indicates the received request is the suspicious request.

5. The method of claim 1, wherein the determining when the received request is the suspicious request further comprises:
updating the suspicious list domain name storage when the determination fails to indicate the threat was repudiated.

6. A network traffic management apparatus, comprising memory comprising programmed instructions stored thereon and one or more processors configured to be capable of executing the stored programmed instructions to:
identify when a domain name identifier in a received request matches one of a plurality of domain names stored in a whitelist domain name storage;
determine when the received request is a suspicious request when the identification indicates the received domain name identifier fails to match one of the plurality of domain names stored in the whitelist domain name storage; and
update another storage when the determination indicates the received request is the suspicious request or otherwise updating the received request as a valid request;
wherein for the determine when the received request is the suspicious request, the one or more processors are further configured to be capable of executing the stored programmed instructions to:
determine when the received domain name identifier matches one of a plurality of domain names stored in a suspicious list domain name storage,
execute threat mitigation on the received request when the determination indicates that the received domain name identifier matches one of the plurality of domain names stored in the suspicious list domain name storage,
determine when the executed threat mitigation repudiated a threat associated with the received domain name identifier, and
update the whitelist domain name storage with the received domain name identifier when the determination indicates the threat was repudiated.

7. The network traffic management apparatus of claim 6, wherein the one or more processors are further configured to be capable of executing the stored programmed instructions to:
determine when the received domain name identifier matches one of a plurality of domain names stored in a blocklist domain name storage; and
block access to the received request when the determination indicates the received domain name identifier matches one of the domain names stored in the blocklist domain name storage.

8. The network traffic management apparatus of claim 6, wherein for the determine when the received request is the suspicious request, the one or more processors are further configured to be capable of executing the stored programmed instructions to:
designate the received request as a suspicious request when the determination indicates that the received domain name identifier fails to match one of the plurality of domain names stored in the whitelist domain name storage.

9. The network traffic management apparatus of claim 6, wherein for the determine when the received request is the suspicious request, the one or more processors are further configured to be capable of executing the stored programmed instructions to:
receive a response from a domain name server in response to the received request when the determination indicates that the received domain name identifier fails to match one of the plurality of domain names stored in the suspicious list domain name storage;
parse the response to identify one or more parameters; and
determine when the received request is a suspicious request based on analyzing the identified one or more parameters.

10. The network traffic management apparatus of claim 6, wherein for the determine when the received request is the suspicious request, the one or more processors are further configured to be capable of executing the stored programmed instructions to:
update the suspicious list domain name storage when the determination fails to indicate the threat was repudiated.

11. A non-transitory computer readable medium having stored thereon instructions for dynamically mitigating network attack comprising executable code which when executed by one or more processors, causes the one or more processors to:
identify when a domain name identifier in a received request matches one of a plurality of domain names stored in a whitelist domain name storage;
determine when the received request is a suspicious request when the identification indicates the received domain name identifier fails to match one of the plurality of domain names stored in the whitelist domain name storage; and
update another storage when the determination indicates the received request is the suspicious request or otherwise updating the received request as a valid request;
wherein for the determine when the received request is the suspicious request, the executable code when executed by the one or more processors further causes the one or more processors to:
determine when the received domain name identifier matches one of a plurality of domain names stored in a suspicious list domain name storage,
execute threat mitigation on the received request when the determination indicates that the received domain name identifier matches one of the plurality of domain names stored in the suspicious list domain name storage,
determine when the executed threat mitigation repudiated a threat associated with the received domain name identifier, and
update the whitelist domain name storage with the received domain name identifier when the determination indicates the threat was repudiated.

12. The non-transitory computer readable medium of claim 11, wherein the executable code when executed by the one or more processors further causes the one or more processors to:
determine when the received domain name identifier matches one of a plurality of domain names stored in a blocklist domain name storage; and
block access to the received request when the determination indicates the received domain name identifier matches one of the domain names stored in the blocklist domain name storage.

13. The non-transitory computer readable medium of claim 11, wherein for the determine when the received request is the suspicious request, the executable code when executed by the one or more processors further causes the one or more processors to:
designate the received request as a suspicious request when the determination indicates that the received domain name identifier fails to match one of the plurality of domain names stored in the whitelist domain name storage.

14. The non-transitory computer readable medium of claim 11, wherein for the determine when the received request is the suspicious request, the executable code when executed by the one or more processors further causes the one or more processors to:
receive a response from a domain name server in response to the received request when the determination indicates that the received domain name identifier fails to match one of the plurality of domain names stored in the suspicious list domain name storage;
parse the response to identify one or more parameters; and
determine when the received request is a suspicious request based on analyzing the identified one or more parameters.

15. The non-transitory computer readable medium of claim 11, wherein for the determine when the received request is the suspicious request, the executable code when executed by the one or more processors further causes the one or more processors to:
update the suspicious list domain name storage when the determination fails to indicate the threat was repudiated.

16. A network traffic management system, comprising one or more traffic management apparatuses, client devices, or server devices, the network traffic management system comprising memory comprising programmed instructions stored thereon and one or more processors configured to be capable of executing the stored programmed instructions to:
identify when a domain name identifier in a received request matches one of a plurality of domain names stored in a whitelist domain name storage;
determine when the received request is a suspicious request when the identification indicates the received domain name identifier fails to match one of the plurality of domain names stored in the whitelist domain name storage; and
update another storage when the determination indicates the received request is the suspicious request or otherwise updating the received request as a valid request;
wherein for the determine when the received request is the suspicious request, the one or more processors are further configured to be capable of executing the stored programmed instructions to:
determine when the received domain name identifier matches one of a plurality of domain names stored in a suspicious list domain name storage,
execute threat mitigation on the received request when the determination indicates that the received domain name identifier matches one of the plurality of domain names stored in the suspicious list domain name storage,
determine when the executed threat mitigation repudiated a threat associated with the received domain name identifier, and
update the whitelist domain name storage with the received domain name identifier when the determination indicates the threat was repudiated.

17. The network traffic management system of claim 16, wherein the one or more processors are further configured to be capable of executing the stored programmed instructions to:
- determine when the received domain name identifier matches one of a plurality of domain names stored in a blocklist domain name storage; and
- block access to the received request when the determination indicates the received domain name identifier matches one of the domain names stored in the blocklist domain name storage.

18. The network traffic management system of claim 16, wherein for the determine when the received request is the suspicious request, the one or more processors are further configured to be capable of executing the stored programmed instructions to:
- designate the received request as a suspicious request when the determination indicates that the received domain name identifier fails to match one of the plurality of domain names stored in the whitelist domain name storage.

19. The network traffic management system of claim 16, wherein for the determine when the received request is the suspicious request, the one or more processors are further configured to be capable of executing the stored programmed instructions to:
- receive a response from a domain name server in response to the received request when the determination indicates that the received domain name identifier fails to match one of the plurality of domain names stored in the suspicious list domain name storage;
- parse the response to identify one or more parameters; and
- determine when the received request is a suspicious request based on analyzing the identified one or more parameters.

20. The network traffic management system of claim 16, wherein for the determine when the received request is the suspicious request, the one or more processors are further configured to be capable of executing the stored programmed instructions to:
- update the suspicious list domain name storage when the determination fails to indicate the threat was repudiated.

* * * * *